US012739517B2

(12) United States Patent
Kurahashi

(10) Patent No.: US 12,739,517 B2
(45) Date of Patent: Sep. 15, 2026

(54) IMAGE DETECTION DEVICE AND IMAGE DETECTION METHOD FOR REDUCING FOCUSING RECOVERY TIME

(71) Applicant: MITUTOYO CORPORATION, Kanagawa (JP)

(72) Inventor: Yuki Kurahashi, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 21 days.

(21) Appl. No.: 18/825,483

(22) Filed: Sep. 5, 2024

(65) Prior Publication Data

US 2025/0088754 A1 Mar. 13, 2025

(30) Foreign Application Priority Data

Sep. 7, 2023 (JP) ................................ 2023-145485

(51) Int. Cl.

| | |
|---|---|
| ***H04N 23/74*** | (2023.01) |
| ***G02B 3/14*** | (2006.01) |
| ***H04N 23/68*** | (2023.01) |

(52) U.S. Cl.

CPC ......... *H04N 23/74* (2023.01); *H04N 23/6812* (2023.01); *H04N 23/682* (2023.01); *G02B 3/14* (2013.01)

(58) Field of Classification Search

CPC .. H04N 23/74; H04N 23/6812; H04N 23/682; G02B 3/14

See application file for complete search history.

(56) References Cited

U.S. PATENT DOCUMENTS

2018/0314033 A1* 11/2018 Sakai ..................... G02B 15/04
2019/0075234 A1 3/2019 Freerksen et al.
2021/0191069 A1* 6/2021 Karam .................... G02B 7/09

FOREIGN PATENT DOCUMENTS

JP 2016-090982 A 5/2016
JP 2019-049543 A 3/2019

* cited by examiner

*Primary Examiner* — Nicholas G Giles

(74) *Attorney, Agent, or Firm* — Greenblum & Bernstein, P.L.C.

(57) ABSTRACT

An image detection device includes: a variable focal length lens whose focal length is periodically changed in response to a drive signal that is periodic; an illuminator configured to illuminate a measurement target; an image detector configured to detect an image of the measurement target through the variable focal length lens; a drive controller configured to output the drive signal to the variable focal length lens; a light-emission controller configured to output a light-emission signal, which is in synchronization with the drive signal, to the illuminator; an oscillation sensor configured to detect oscillation information of the variable focal length lens; and a synchronous controller configured to adjust an output timing of the light-emission signal based on the oscillation information.

3 Claims, 5 Drawing Sheets

IMAGE DETECTION DEVICE AND IMAGE DETECTION METHOD FOR REDUCING FOCUSING RECOVERY TIME

CROSS REFERENCE TO RELATED APPLICATIONS

The entire disclosure of Japanese Patent Application No. 2023-145485 filed Sep. 7, 2023 is expressly incorporated by reference herein.

TECHNICAL FIELD

The present invention relates to an image detection device and an image detection method.

BACKGROUND ART

Image detection devices are used in detection of images in various fields. In an image detection device, an image sensor such as a camera is used in detection of images, and an optical system including a lens/lenses and a focus adjusting mechanism is provided between the image sensor and a workpiece. As the focus adjusting mechanism, an automatic focus adjusting mechanism has been employed.

The image detection device is also used in in-line inspection in which an image of a workpiece is taken in the middle of a manufacturing line. In the in-line inspection, the image of the workpiece held by a table of a machining device is taken, and a defect and the like in a detected image are determined.

In the image detection device for the in-line inspection, influence by oscillation from surrounding manufacturing devices and the like is inevitable. It is likely that the influence by the oscillation on an optical system that captures the image of the workpiece is more significant than that on the workpiece held by the table and a focusing state of the optical system relative to the workpiece may be thus deviated due to the oscillation.

Therefore, an automatic focus adjusting mechanism has been developed that is capable of efficiently restoring a focusing state even if the focusing state is deviated due to oscillation and the like (see Literature 1: JP 2016-90982 A).

Meanwhile, a tunable acoustic gradient index lens (TAG lens) or a high-speed variable focal length lens (VFL) called a liquid resonant lens (see Literature 2: JP 2019-49543 A) is usable as an optical element in the image detection device.

The TAG lens is configured to function as a high-speed VFL lens by oscillating a piezoelectric element in a container with a drive signal with a high frequency at a maximum of about several hundreds KHz to cause inside fluid to resonate, thereby generating concentric standing waves with different refractive indices. The TAG lens is capable of periodically changing a focal length with a high speed in accordance with a resonance frequency.

The focus deviation due to the oscillation in the in-line inspection can be prevented by the automatic focus adjusting mechanism of Literature 1 referred to above and the like.

However, in the case where an optical system of the image detection device is, for example, a mechanical optical system using optical-axis-direction movement of lens element(s) for focusing adjustment, a period of time for moving the lens element(s) is needed until the focusing state recovery. Thus, a blurred image in an out-of-focus state is detected during such a period of time. Further, even in the case where the optical-axis-direction movement of the lens element(s) is not necessary in the focusing adjustment as in the TAG lens, a time lag is generated in processing from detection of deviation of the focusing state to re-adjustment to the focusing state, and detection of a blurred image in an out-of-focus state during the time lag is inevitable.

Such a blurred image detection may cause deterioration in image quality, for example, when detecting multi-plane images or extended depth of focus images (EDOF images). Thus, it has been required to reduce focusing recovery time when a focal position is deviated and to avoid detection of blurred images.

SUMMARY OF THE INVENTION

An object of the invention is to provide an image detection device and an image detection method capable of reducing focusing recovery time when a focal position is deviated.

An image detection device of an aspect of the invention includes: a variable focal length lens, a focal length of the variable focal length lens being periodically changed in response to a drive signal that is periodic; an illuminator configured to illuminate a measurement target; an image detector configured to detect an image of the measurement target through the variable focal length lens; a drive controller configured to output the drive signal to the variable focal length lens; a light-emission controller configured to output a light-emission signal to the illuminator, the light-emission signal being in synchronization with the drive signal; an oscillation sensor configured to detect oscillation information of the variable focal length lens; and a synchronous controller configured to adjust an output timing of the light-emission signal based on the oscillation information.

In the above aspect of the invention, an image of the measurement target illuminated by the illuminator is detected by the image detector through the variable focal length lens. The light-emission controller adjusts a synchronous phase of the light-emission signal in synchronization with the drive signal, thereby adjusting the focal length of the variable focal length lens, so that a detected image can be in a focusing state at a predetermined focal length.

When the focal length of the variable focal length lens varies due to oscillation from the outside and the like, the oscillation sensor detects the oscillation information and the synchronous controller adjusts the output timing of the light-emission signal on the basis of the oscillation information, and thereby variation of the focal length in the variable focal length lens is compensated for and the focusing state is restored. The compensation of the variation of the focal length based on the oscillation information can be performed by means of, for example, arithmetic processing using functions. For example, it is possible to perform processing and the like of detecting a displacement of the oscillation on the basis of the oscillation information, calculating a time difference corresponding to the displacement, and shifting the light-emission signal by the time difference.

In the aspect of the invention, in the restoration of the focusing state, neither processing of performing focusing adjustment by repeating focus determination feedback of the detected image, as performed in an existing automatic focus adjusting mechanism, nor mechanical focus adjusting operation is necessary. Therefore, the processing time before the focusing restoration can be significantly reduced. As a result, the inconvenience caused by detection of blurred images when the focusing state is deviated can be avoided.

In the image detection device in the aspect of the invention, it is preferable that the oscillation sensor is an acceleration sensor attached to a container of the variable focal length lens, and the synchronous controller is a pulse delay module configured to delay a pulse of the light-emission signal.

In this aspect of the invention, the synchronous controller calculates a displacement amount caused by oscillation, from acceleration detected by the acceleration sensor, and delays the light-emission signal by a time difference corresponding to the displacement amount, and thereby the focal length of the variable focal length lens can be adjusted and the focusing state can be restored.

In the aspect of the invention, an existing pulse delay module and an existing acceleration sensor are usable. Accordingly, the device can be simplified in configuration. Here, the pulse delay module is preferably capable of transmitting a pulse of, for example, about several tens to several hundreds ns, in order to achieve a high-speed synchronizable with a resonance frequency of the TAG lens or VFL described above.

It should be noted that the oscillation sensor may detect a relative displacement between an optical system including the variable focal length lens and a workpiece and may detect the oscillation from a change in the relative displacement with time.

An image detection method of another aspect of the invention using an image detection device, the image detection device including: a variable focal length lens, a focal length of the variable focal length lens being periodically changed in response to a drive signal that is periodic; an illuminator configured to illuminate a measurement target; an image detector configured to detect an image of the measurement target through the variable focal length lens; a drive controller configured to output the drive signal to the variable focal length lens; and a light-emission controller configured to output a light-emission signal to the illuminator, the light-emission signal being in synchronization with the drive signal, in which the light-emission signal is adjusted so that the image of the measurement target to be detected by the image detector is in a focusing state, and the image of the measurement target in the focusing state is detected, and oscillation of the variable focal length lens is detected to acquire oscillation information, and an output timing of the light-emission signal is adjusted based on the oscillation information acquired.

By the image detection method in this aspect of the invention, effects can be obtained as described for the image detection device in the foregoing aspect of the invention.

According to the invention, it is possible to provide an image detection device and an image detection method capable of reducing focusing recovery time when a focal position is deviated.

DETAILED DESCRIPTION

An exemplary embodiment of the invention will be described below with reference to the attached drawings.

Image Detection Device 1

Figure 1:
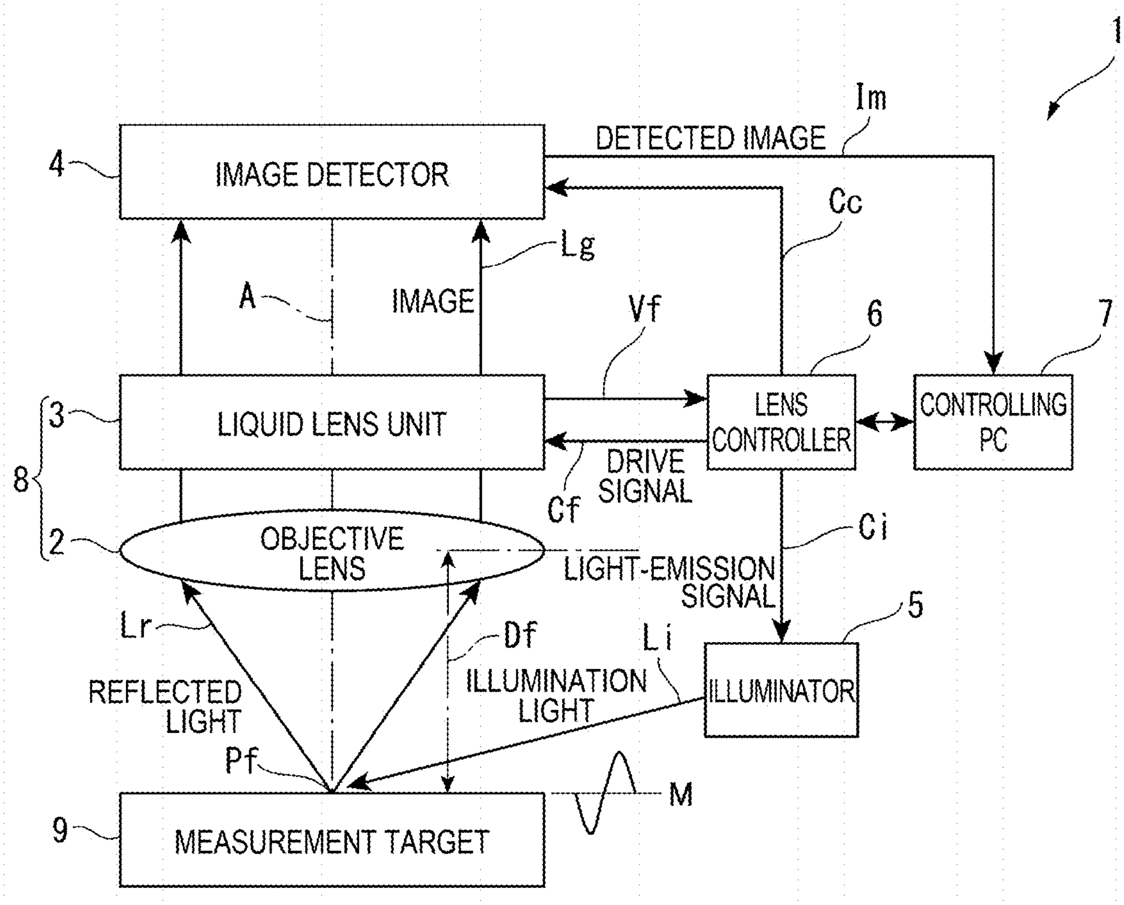
FIG. 1 is a schematic view illustrating an image detection device according to an exemplary embodiment of the invention.

In FIG. 1, an image detection device 1 is configured to detect an image of a surface of a measurement target 9 while varying a focal length.

Therefore, the image detection device 1 includes an objective lens 2 and a liquid lens unit 3 disposed on a same optical axis A that intersects the surface, an image detector 4 that detects an image of the measurement target 9 acquired through the objective lens 2 and the liquid lens unit 3, an illuminator 5 that illuminates the surface of the measurement target 9, a lens controller 6 that controls operations of the liquid lens unit 3 and the illuminator 5, and a controlling PC 7 for operating the lens controller 6.

In the image detection device 1, the objective lens 2 and the liquid lens unit 3 configure a variable focal length lens 8.

An existing convex lens is used as the objective lens 2.

The liquid lens unit 3 itself is a high-speed variable focal length lens (VFL) of a type called a tunable acoustic gradient index lens (TAG lens) or a liquid resonant lens. The refractive index of the liquid lens unit 3 is periodically changed in response to a drive signal Cf input from the lens controller 6.

The drive signal Cf is an AC signal with a frequency that generates a standing wave in the liquid lens unit 3 and is, for example, a sinusoidal AC signal of 70 KHz.

In the image detection device 1, a focal length Df of the variable focal length lens 8 extending to a focal position Pf, which is based on a focal length of the objective lens 2, is modulated in accordance with the refractive index of the liquid lens unit 3. Accordingly, the focal length Df of the variable focal length lens 8 varies in a focal-point-variation waveform Mf of sinusoidal wave shape in synchronization with the drive signal Cf.

The image detector 4 is configured including an existing CCD (Charge Coupled Device) image sensor or a camera of another type and the like. The image detector 4 is capable of outputting an image Lg incident on the image detector 4 to the controlling PC 7 as a detected image Im in a predetermined signal form.

The illuminator 5 is configured including a light-emitting element such as an LED (Light Emitting Diode). The illuminator 5 irradiates the measurement target 9 with illumination light Li, and thereby reflected light Lr reflected off a surface of the measurement target 9 generates the image Lg through the objective lens 2 and the liquid lens unit 3, and the image Lg is detected as the detected image Im by the image detector 4.

The light emission of the illuminator 5 is performed only in a predetermined micro time when a light-emission signal Ci is input from the outside, and thereby pulsed illumination can be performed. Consequently, the detected image Im detected by the image detector 4 is an image of the measurement target 9 at a point in time when the pulsed illumination is performed.

The lens controller 6 is configured to control drive of the liquid lens unit 3, light emission of the illuminator 5, and image detection of the image detector 4. Therefore, the drive signal Cf is output from the lens controller 6 to the liquid lens unit 3, the light-emission signal Ci is output from the lens controller 6 to the illuminator 5, and an image detection signal Cc is output from the lens controller 6 to the image detector 4. On the other hand, an effective power, drive current or the like applied to the liquid lens unit 3 is returned to the lens controller 6, as an oscillation state Vf of the liquid lens unit 3.

Figure 2:
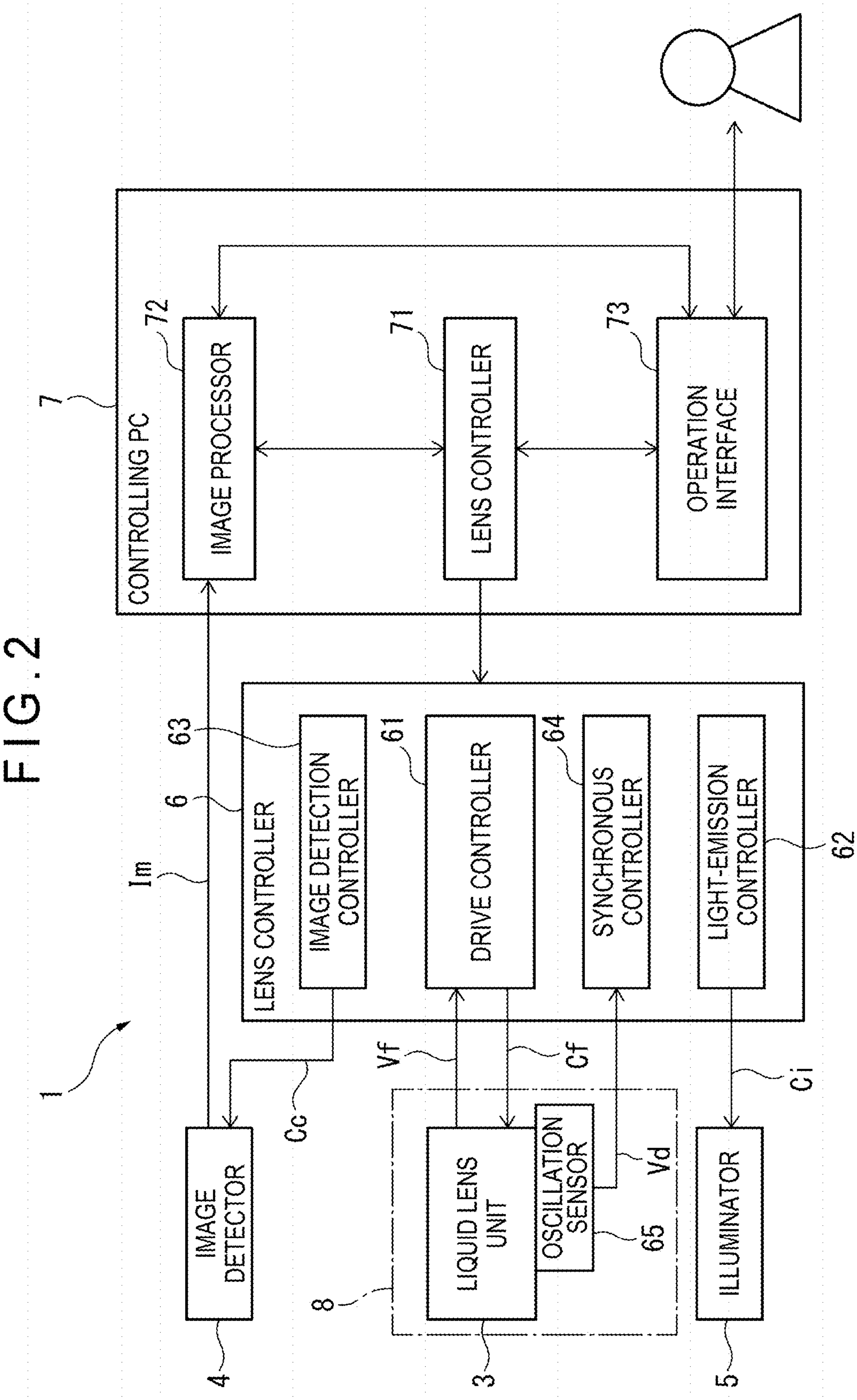
FIG. 2 is a block diagram illustrating a control system according to the exemplary embodiment.

In FIG. 2, the lens controller 6 includes a drive controller 61 that outputs the drive signal Cf to the liquid lens unit 3, a light-emission controller 62 that outputs the light-emission signal Ci to the illuminator 5, and an image detection controller 63 that outputs the image detection signal Cc to the image detector 4.

The drive controller 61 outputs the drive signal Cf to the liquid lens unit 3 to generate a resonant state of the liquid lens unit 3, and also controls the drive signal Cf so that the liquid lens unit 3 is in a desired resonant state by inspecting the oscillation state Vf of the liquid lens unit 3.

The image detection controller 63 outputs the image detection signal Cc to the image detector 4 to control the image detection.

The light-emission controller 62 outputs the light-emission signal Ci to the illuminator 5 to control an illumination state of the measurement target 9, so that an image format of the detected image Im to be detected by the image detector 4 can be selected.

In the light-emission controller 62, pulse output of the light-emission signal Ci from the light-emission controller 62 is performed at a predetermined phase in the focal-point-variation waveform Mf of the focal length Df, and thereby pulsed illumination of the measurement target 9 is performed by the illuminator 5 and an image at the predetermined phase is detected by the image detector 4. Accordingly, in the image detector 4, it is possible to acquire the detected image Im focused at the focal position Pf at a point in time of light emission.

In the focal-point-variation waveform Mf of the focal length Df, for example, when an image is detected at one position in one cycle, the detected image is a single-plane mode image with one focal plane, and when an image is detected at a plurality of positions, the detected image is a multi-plane mode image with a plurality of focal planes. Furthermore, a frame-by-frame mode, a combined mode and the like can be selected by combining these image formats.

Figure 3:
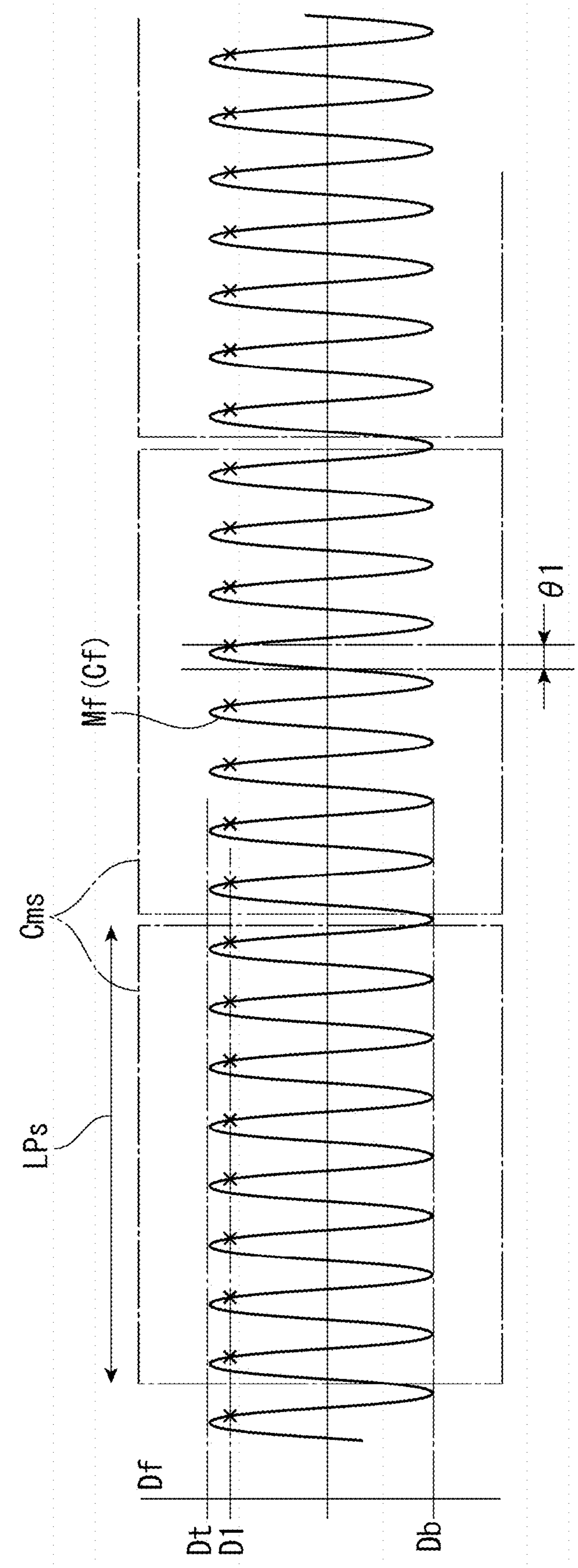
FIG. 3 is a graph illustrating image detection in a single-plane mode according to the exemplary embodiment.

In FIG. 3, in the single-plane mode, an image detection loop LPs only including a single-plane-image-detecting operation Cms is repeatedly performed.

As described above, in the image detection device 1, the focal-point-variation waveform Mf of the focal length Df of the variable focal length lens 8 varies in sinusoidal wave shape in synchronization with the drive signal Cf. Consequently, when the drive signal Cf input to the liquid lens unit 3 from the lens controller 6 is at the maximum value, the focal-point-variation waveform Mf is also at the maximum value, and the focal length Df of the liquid lens unit 3 and the objective lens 2 is a focal length Dt closest to the objective lens 2. Similarly, when the drive signal Cf and the focal-point-variation waveform Mf are at the minimum values, the focal length Df is a focal length Db farthest from the objective lens 2.

In the image detection loop LPs in the single-plane mode, the light-emission signal Ci is transmitted to the illuminator 5 from the lens controller 6 at a position of a phase θ1 corresponding to a specified focal length D1 in one cycle of the drive signal Cf, and thereby a single-plane detected image focused in the focal length D1 is acquired by the image detector 4.

Figure 4:
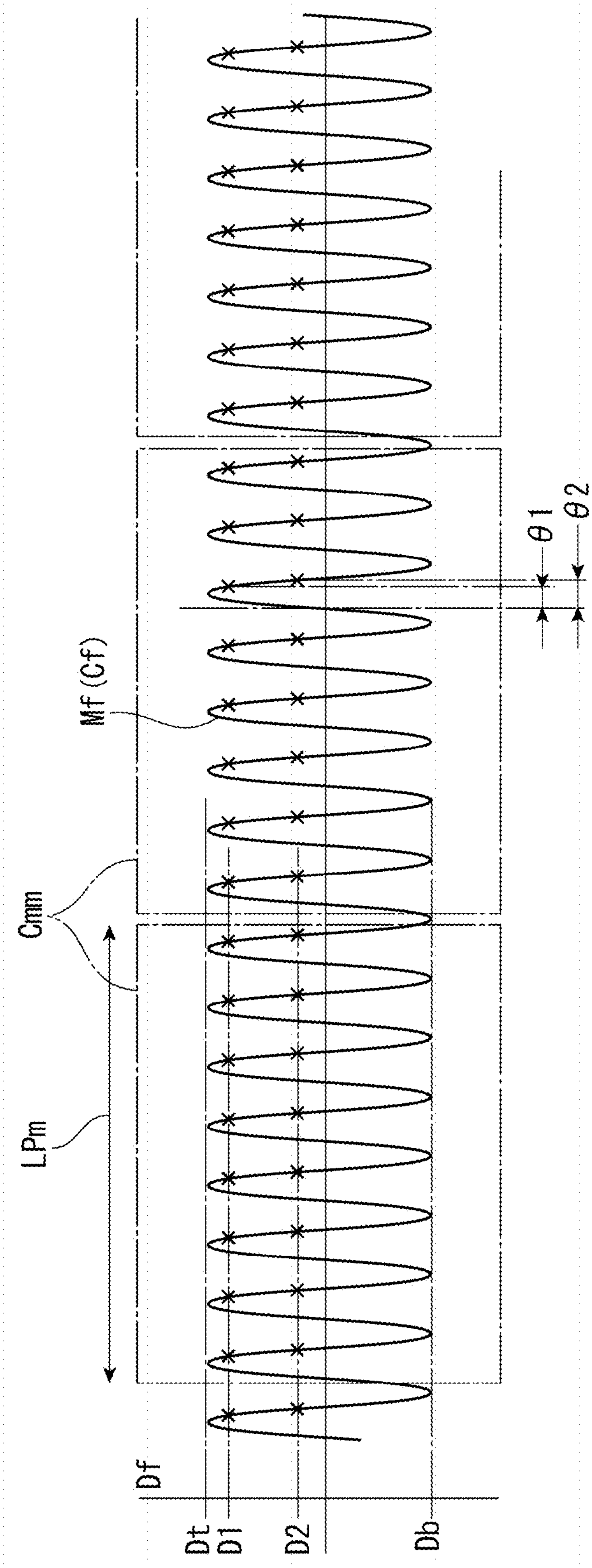
FIG. 4 is a graph illustrating image detection in a multi-plane mode according to the exemplary embodiment.

In FIG. 4, in the multi-plane mode, an image detection loop LPm only including a multi-plane-image-detecting operation Cmm is repeatedly performed by the lens controller 6.

In the image detection loop LPm in the multi-plane mode, provided that the number of the focal points is equal to two (np=2), two focal lengths D1 and D2 are specified in one cycle of the drive signal Cf, and the light-emission signal Ci is transmitted by the lens controller 6 at positions of phases θ1 and θ2 respectively corresponding to the focal lengths D1 and D2. Accordingly, a multi-plane detected image Imm focused in the focal lengths D1 and D2 is acquired.

Referring back to FIG. 2, the controlling PC 7 is connected in order to operate image detection conditions such as settings of the lens controller 6.

The controlling PC 7 includes a lens operator 71 that performs operations of the lens controller 6 such as the settings of the image detection conditions, an image processor 72 that imports the detected image Im from the image detector 4 to process the detected image Im, and an operation interface 73 that receives a user's operation on the image detection device 1.

The controlling PC 7 is configured including an existing personal computer, and desired functions of the controlling PC 7 are achieved by running predetermined control software on the controlling PC7.

In the exemplary embodiment, a synchronous controller 64 based on the invention is installed in the lens controller 6, and also an oscillation sensor 65 is installed in the liquid lens unit 3.

The oscillation sensor 65 is configured including, for example, an existing acceleration sensor and is capable of detecting acceleration as oscillation information Vd. The oscillation sensor 65 is mounted to a container of the liquid lens unit 3. The oscillation sensor 65 may be mounted to any portion of an optical system from the variable focal length lens 8 to the image detector 4.

The synchronous controller 64 calculates a displacement amount caused by oscillation, on the basis of the oscillation information Vd acquired by the oscillation sensor 65. Then, the synchronous controller 64 adjusts an output timing of the light-emission signal Ci output from the light-emission controller 62 such that the displacement amount is canceled in the focal length Df of the variable focal length lens 8.

Specifically, the synchronous controller 64 analyzes spectra of the oscillation by, for example, performing FFT (Fast Fourier Transform) on the oscillation information Vd from the oscillation sensor 65, and detects a main oscillation frequency and phase. An optical magnification, and an amplitude and a phase of oscillation of the variable focal length lens 8 are also taken into consideration, in addition to the acquired oscillation frequency and phase, so that a delay time relative to the output timing of the light-emission signal Ci can be calculated. When the delay time is acquired, the focal length Df of the variable focal length lens 8 is adjusted by delaying the light-emission signal Ci by the delay time, and the focusing state can thereby be restored.

Calculation of the displacement amount based on the oscillation information Vd and calculation of an adjustment amount for the output timing of the light-emission signal Ci in accordance with the displacement amount can be set as functions, or may be referable as a data table of values appropriately adjusted by tests in advance.

Figure 5:
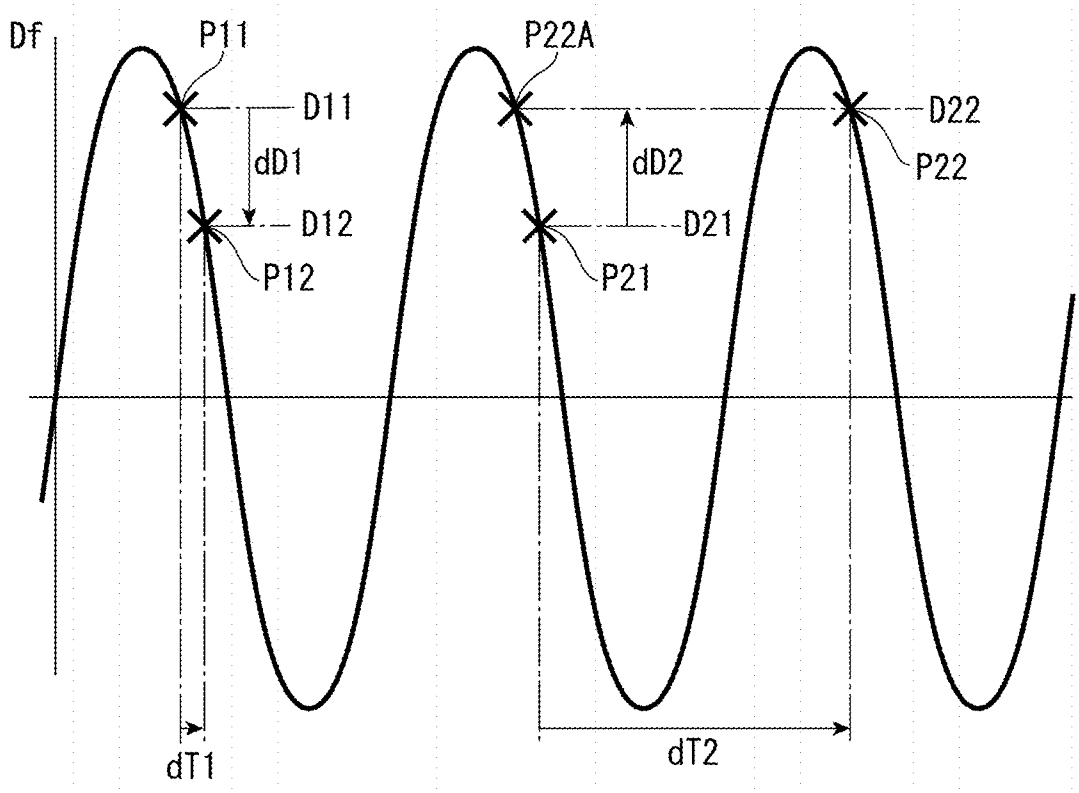
FIG. 5 is a graph illustrating synchronization operations according to the exemplary embodiment.

In FIG. 5, when the oscillation information Vd is detected at a point P11 on the focal-point-variation waveform Mf and a calculated displacement amount is a displacement amount dD1, the focal length Df of the variable focal length lens 8 is deviated from a focal position D11 corresponding to the point P11 on the focal-point-variation waveform Mf to a focal position D12. Then, the point P11 is displaced to a point P12 on the focal-point-variation waveform Mf by delaying the output timing of the light-emission signal Ci by a time difference dT1 corresponding to the displacement amount dD1, which makes it possible to restore the focal length Df of the variable focal length lens 8 at the focal position D12.

The similar processing can be performed also for a displacement in a reversed direction.

When the oscillation information Vd is detected at a point P21 on the focal-point-variation waveform Mf and a calculated displacement amount is a displacement amount dD2, the focal length Df of the variable focal length lens 8 is deviated from a focal position D21 corresponding to the point P21 on the focal-point-variation waveform Mf to a focal position D22. However, a delay to a point P22A closest to the focal position D22 is impossible. Then, a point P22 corresponding to the displacement amount dD2 in one cycle later of the focal-point-variation waveform Mf is selected, and the point P21 is displaced to the point P22 on the focal-point-variation waveform Mf by delaying the output timing of the light-emission signal Ci by a time difference dT2 from the point P21 to the point P22, which makes it possible to restore the focal length Df of the variable focal length lens 8 at the focal position D22.

In the exemplary embodiment described above, effects as follows can be obtained.

In the exemplary embodiment, an image of the measurement target 9 illuminated by the illuminator 5 is detected by the image detector 4 through the variable focal length lens 8 (the objective lens 2 and the liquid lens unit 3). The light-emission controller 62 (see FIG. 2) adjusts a synchronous phase of the light-emission signal Ci in synchronization with the drive signal Cf, thereby adjusting the focal length Df of the variable focal length lens 8, so that the detected image Im can be in a focusing state at a predetermined focal length Df.

When the focal length Df of the variable focal length lens 8 varies due to oscillation from the outside and the like, the oscillation sensor 65 (see FIG. 2) detects the oscillation information Vd and the synchronous controller 64 adjusts the output timing of the light-emission signal Ci on the basis of the oscillation information, and thereby the variation of the focal length Df in the variable focal length lens 8 is compensated for and the focusing state is restored.

Accordingly, in the restoration of the focusing state, neither processing of performing focusing adjustment by repeating focus determination feedback of the detected image Im, as performed by an existing automatic focus adjusting mechanism, nor mechanical focus adjusting operation is necessary. Therefore, the processing time before the focusing restoration can be significantly reduced. As a result, the inconveniences caused by detection of blurred images when the focusing state is deviated can be avoided.

In the exemplary embodiment, in the synchronous controller 64, the displacement amounts dD1 and dD2 (see FIG. 5) caused by oscillation are calculated from acceleration detected by the oscillation sensor 65, and the focal length Df of the variable focal length lens 8 (the objective lens 2 and the liquid lens unit 3) is adjusted by delaying the light-emission signals by the time differences dT1 and dT2 respectively corresponding to the displacement amounts dD1 and dD2, and the focusing state can thereby be restored.

In the exemplary embodiment, a low-pass filter is used as the pulse delay module in the synchronous controller 64, and an existing acceleration sensor is used as the oscillation sensor 65. Accordingly, the device can be simplified in configuration and can be reduced in cost.

It should be noted that the invention is by no means limited to the above-described exemplary embodiment and modifications and the like are within the scope of the invention as long as the object of the invention is achievable.

The acceleration sensor is used as the oscillation sensor 65 in the exemplary embodiment described above. However, the oscillation sensor 65 is not limited to the acceleration sensor, and another type of a sensor may be used that is capable of measuring a state of oscillation propagated from the outside to the variable focal length lens 8 and the image detector 4 that are included in the optical system of the image detection device 1.

Further, the oscillation sensor 65 may detect a relative displacement between the optical system including the variable focal length lens 8 (the objective lens 2 and the liquid lens unit 3) and the measurement target 9, and may detect the oscillation information Vd from a change in the relative displacement with time.

In the exemplary embodiment described above, the synchronous controller 64 calculates the time differences dT1 and dT2 respectively corresponding to the displacement amounts dD1 and dD2 detected from the oscillation information Vd, and performs processing of shifting the light-emission signal Ci by the respective time differences. In contrast, another method may be employed such as a method in which the cycle and the amplitude are acquired from the oscillation information Vd and the adjustment amount of the light-emission signal Ci under the corresponding condition is read out from a data table.

What is claimed is:

1. An image detection device, comprising:

a variable focal length lens, a focal length of the variable focal length lens being periodically changed in response to a drive signal that is periodic;

an illuminator configured to illuminate a measurement target;

an image detector configured to detect an image of the measurement target through the variable focal length lens;

a drive controller configured to output the drive signal to the variable focal length lens;

a light-emission controller configured to output a light-emission signal to the illuminator, the light-emission signal being in synchronization with the drive signal;

an oscillation sensor configured to detect oscillation information of the variable focal length lens; and a synchronous controller configured to adjust an output timing of the light-emission signal based on the oscillation information, wherein the oscillation sensor is an acceleration sensor attached to a container of the variable focal length lens, and the synchronous controller is configured to calculate a displacement amount caused by oscillation applied from outside to the variable focal length lens, and adjust an output timing of the light-emission signal output from the light-emission controller such that the displacement amount is canceled in the focal length of the variable focal length lens.

2. The image detection device according to claim 1, wherein the synchronous controller is a pulse delay module configured to delay a pulse of the light-emission signal.

3. An image detection method using an image detection device, the image detection device comprising:

a variable focal length lens, a focal length of the variable focal length lens being periodically changed in response to a drive signal that is periodic;

an illuminator configured to illuminate a measurement target;

an image detector configured to detect an image of the measurement target through the variable focal length lens;

a drive controller configured to output the drive signal to the variable focal length lens; and a light-emission controller configured to output a light-emission signal to the illuminator, the light-emission signal being in synchronization with the drive signal, wherein the light-emission signal is adjusted so that the image of the measurement target to be detected by the image detector is in a focusing state, and the image of the measurement target in the focusing state is detected, and oscillation applied from outside to the variable focal length lens is detected by an acceleration sensor attached to a container of the variable focal length lens to acquire oscillation information, a displacement amount caused by the oscillation applied from outside to the variable focal length lens is calculated based on the oscillation information acquired, and an output timing of the light-emission signal is adjusted such that the displacement amount is canceled in the focal length of the variable focal length lens.

* * * * *